United States Patent [19]
Yoshikawa et al.

[11] Patent Number: 5,493,188
[45] Date of Patent: Feb. 20, 1996

[54] CONTROL DEVICE FOR BRUSHLESS MOTOR AND CONTROL METHOD THEREFOR

[75] Inventors: Rikio Yoshikawa; Shuichi Kobayashi, both of Shizuoka, Japan

[73] Assignee: Kokusan Denki Co., Ltd., Shizuoka, Japan

[21] Appl. No.: 325,864

[22] Filed: Oct. 19, 1994

[51] Int. Cl.⁶ .......................................... H02P 6/24
[52] U.S. Cl. ............................... 318/254; 318/430
[58] Field of Search ..................... 318/138, 254, 318/362, 368, 373, 375, 430, 436, 439, 612

[56] References Cited

U.S. PATENT DOCUMENTS

| | | |
|---|---|---|
| 3,736,488 | 5/1973 | Abraham et al. . |
| 3,895,277 | 7/1975 | Klumpp . |
| 3,958,163 | 5/1976 | Clark . |
| 3,979,651 | 9/1976 | Bringol . |
| 3,995,204 | 11/1976 | Konrad et al. . |
| 4,054,819 | 10/1977 | Johnson . |
| 4,054,821 | 10/1977 | Williamson . |
| 4,438,377 | 3/1984 | Sakai et al. . |
| 4,455,515 | 6/1984 | Uzuka ................................ 318/254 |
| 4,549,120 | 10/1985 | Banno et al. ........................ 318/254 |
| 4,629,949 | 12/1986 | Senso ................................... 318/257 |
| 4,742,282 | 5/1988 | Okutani et al. ..................... 318/374 |
| 4,833,378 | 5/1989 | Furue et al. ........................ 318/374 |
| 4,926,101 | 5/1990 | Enomoto et al. .................. 318/374 |
| 5,010,283 | 4/1991 | Kitajima et al. ................... 318/373 |

*Primary Examiner*—Bentsu Ro
*Attorney, Agent, or Firm*—Pearne, Gordon, McCoy & Granger

[57] ABSTRACT

A control device for a brushless motor capable of stopping the brushless motor without any complicated control. The control device includes a rotation control section to which an output of a position detector detecting a polarity of a magnet field of a rotor on a side of a stator is fed and which generates a driving signal of a predetermined polarity based on the output of the position detector input thereto. Also it includes a motor driving section to which the driving signal is fed and which flows an excitation current through a driving coil for a phase determined depending on a polarity of the driving signal input thereto. The rotation control section includes a latch circuit which feeds the motor driving section with a signal of a polarity corresponding to that of an output signal of the position detector while it is fed with a rotation command and holds, when it is fed with a stop command, the signal fed to the motor driving section at a polarity thereof obtained at the time of feeding of the stop command thereto.

13 Claims, 8 Drawing Sheets

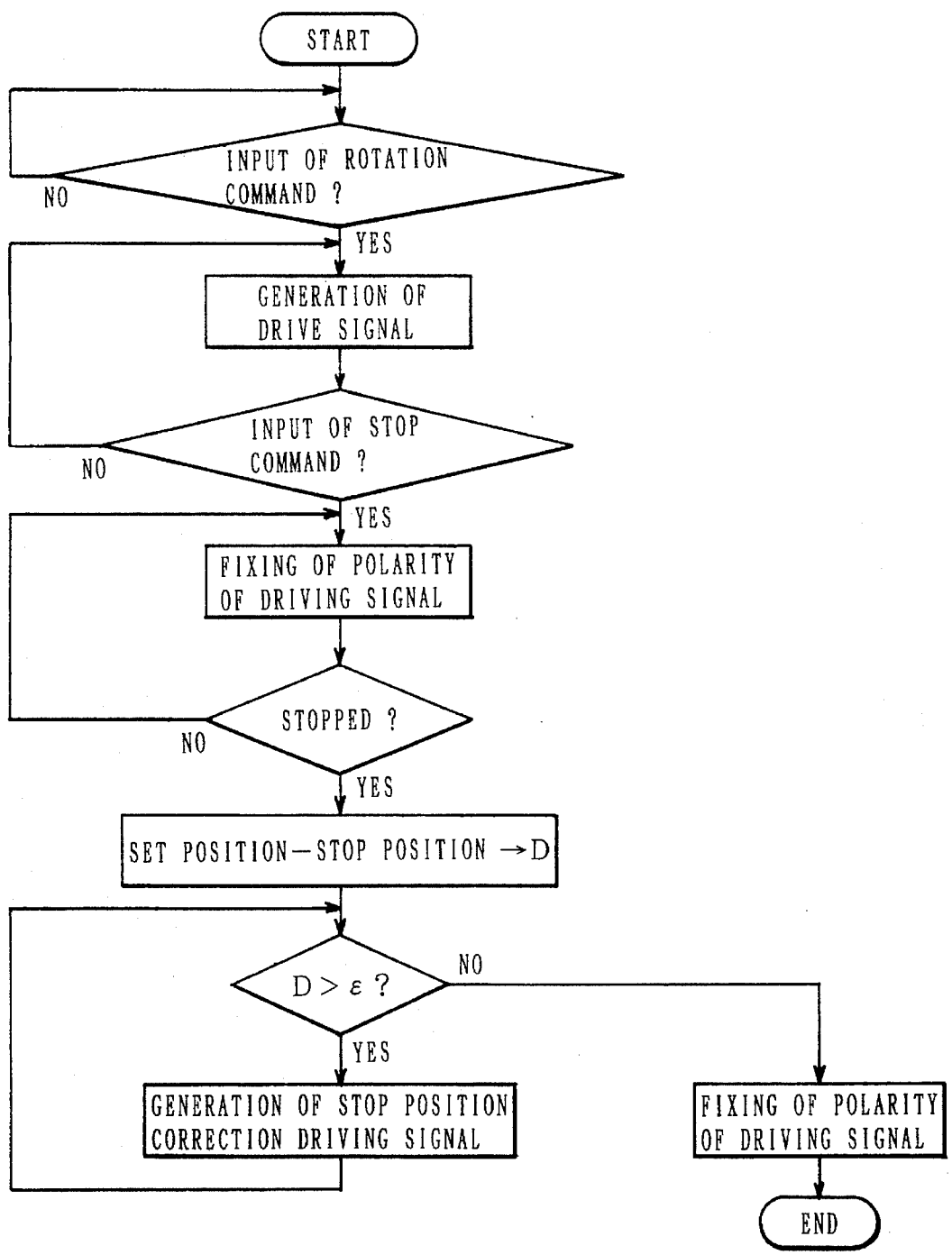

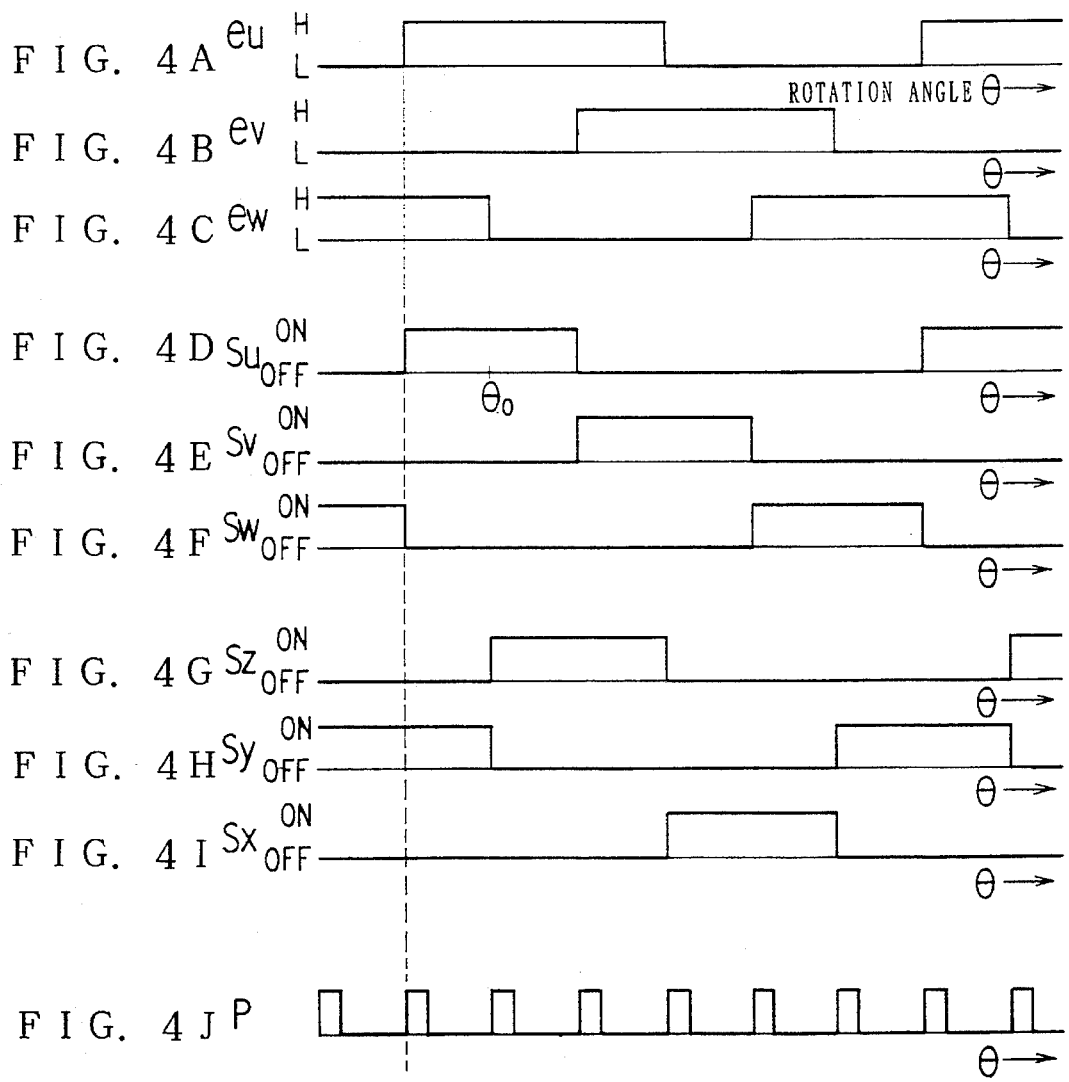

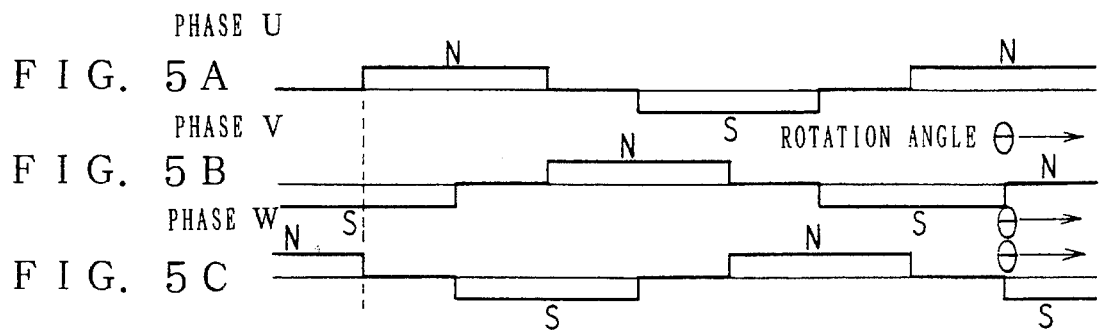
FIG. 5A PHASE U
FIG. 5B PHASE V
FIG. 5C PHASE W
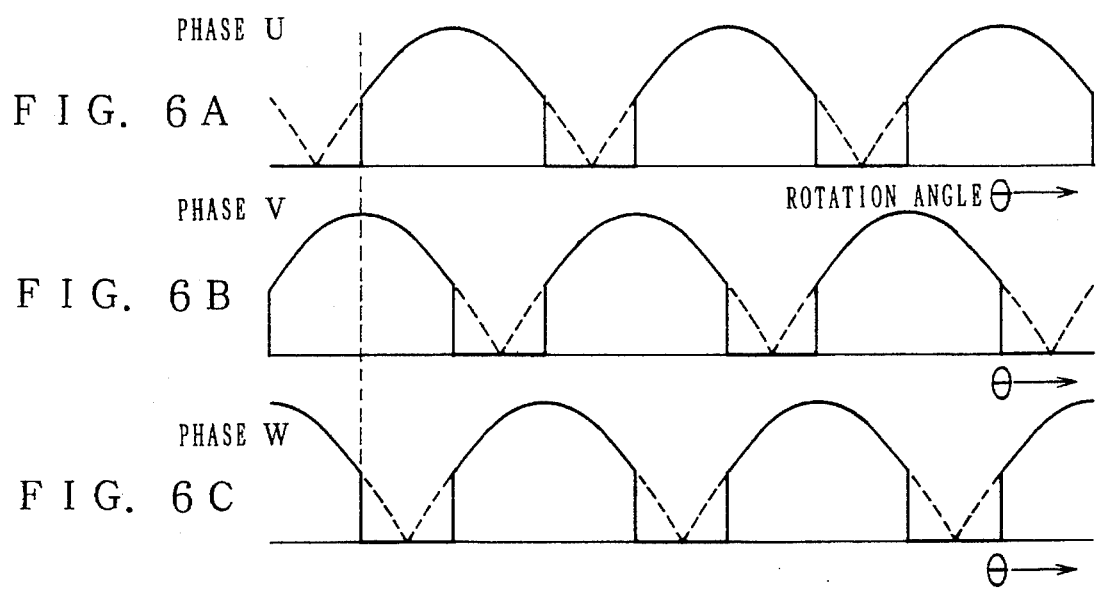
FIG. 6A PHASE U
FIG. 6B PHASE V
FIG. 6C PHASE W

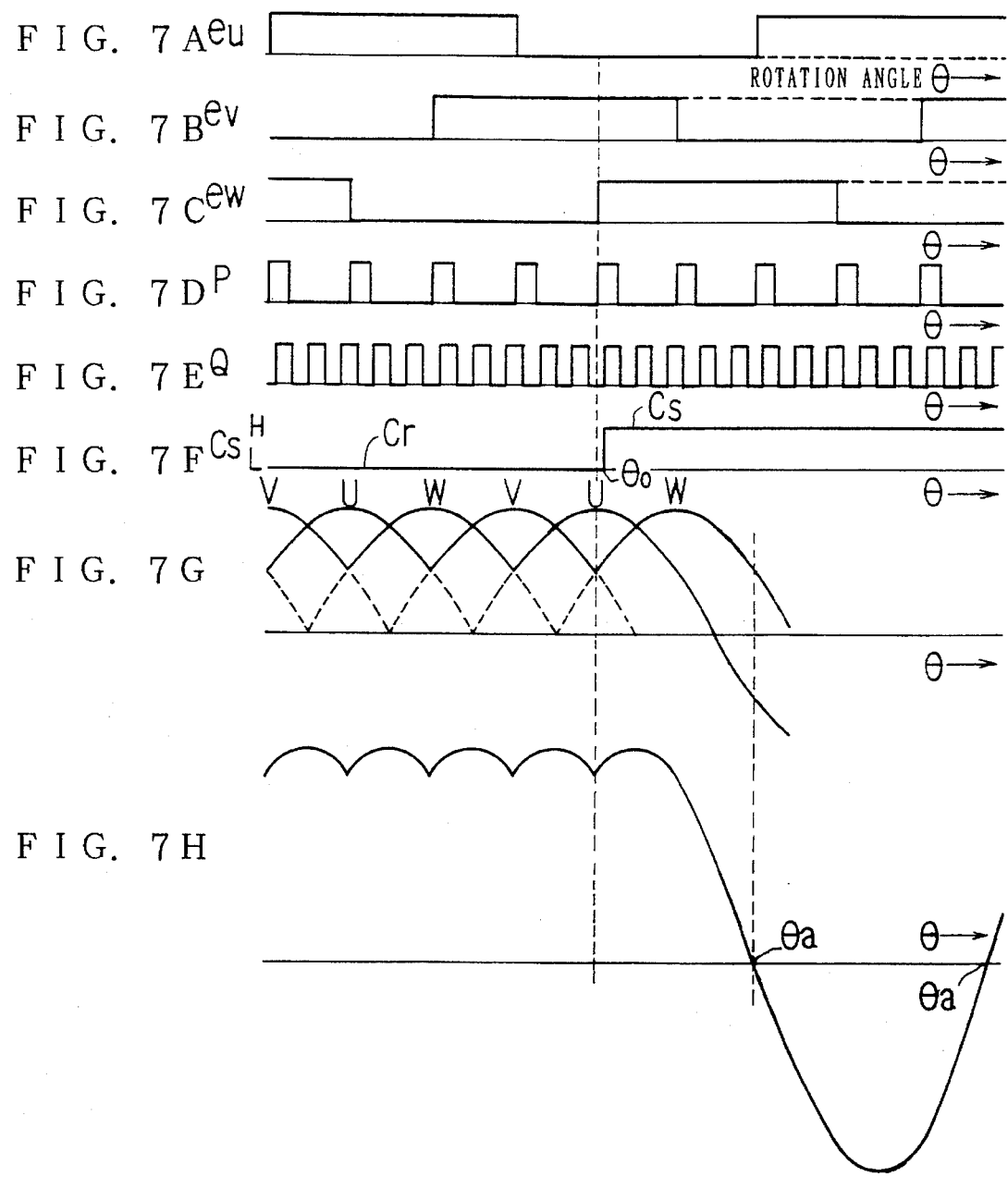

CONTROL DEVICE FOR BRUSHLESS MOTOR AND CONTROL METHOD THEREFOR

BACKGROUND OF THE INVENTION

This invention relates to a control device for a brushless motor and a control method therefor, and more particularly to a control device for a brushless motor adapted to excite driving coils of a stator in turn depending on an output of a position detector for detecting a position of a rotor, to thereby rotate the rotor and a control method therefor.

A brushless motor generally includes a rotor having a magnet field and a stator including driving coils for multiple phases. A control device for the brushless motor is constituted by a position detector for detecting a position of magnetic poles of the rotor and a motor driving section for changing over an excitation phase of each of the driving coils of the stator depending on an output of the position detector (determining driving coils to be excited to flow an exciting current to the driving coils determined in turn).

Referring now to FIG. 10, an essential part of a brushless motor of the three-phase outer rotor type is illustrated. In FIG. 10, reference numeral 1 designates a rotor and 2 is a stator. The rotor 1 includes a yoke 100 formed into a cup-like shape and a magnet field 101 mounted on an inner periphery of the yoke 100. The magnet field 101 may comprise a ring-like magnet having two magnetic poles which is mounted on the inner periphery of the yoke 100. The stator 2 includes an armature core including an annular yoke section 201a and three silent-pole sections 201u to 201w radially projected at angular intervals of 120 degrees from the yoke section 201a, as well as driving coils 202u to 202w for three phases U, V and W wound on the silent-pole sections 201u to 201w of the core 201, respectively.

3u to 3w are position sensors for the three phases U, V and W which constitute a position detector. The position sensors 3u, 3V and 3 W are arranged in correspondence to central positions of the silent-pole sections for the phases V, W and U, respectively. The position sensors 3u to 3w function to detect a polarity (N pole or S pole) of the magnet field of the rotor 1 opposite to each of the silent-pole sections, to thereby detect a position of the rotor 1 with respect to each of the driving coils 202u to 202w for the three phases. In other words, the position sensors detect positional relationships between the driving coils for the three phases and a plurality of magnetic poles.

FIG. 11 shows an example of a conventional control device for the brushless motor, wherein reference numeral 4 indicates a motor driving section which has three position detection signals input thereto from the position detector 3 comprising the position sensors 3u to 3w and functions to change over an excitation phase of the stator 2 depending on a variation in level of an output of each of the position sensors 3u to 3w. 5 is a rotational speed detector for detecting a rotational speed of the rotor based on a frequency of a signal generated from the position detector 3. 6 is an output control section for controlling the motor driving section 4, which functions to keep the rotational speed of the rotor at an indicated value based on an output of the rotational speed detector 5 input thereto, change over a direction of rotation of the rotor when it is externally fed with a rotational direction changing-over command, short-circuit the driving coils when it is fed with a stop command, or reverse a direction of an excitation current to permit the motor to act as a generator, to thereby brake the rotor.

U.S. Pat. No. 4,054,821 discloses braking of a rotor while using a motor as a generator. U.S. Pat. No. 4,054,819 discloses techniques for reversing an excitation current to brake a rotor during normal rotation of the rotor. Techniques of reversing a direction of flowing of an excitation current to brake the rotor are likewise disclosed in U.S. Pat. No. 3,958,163 and U.S. Pat. No. 3,995,204.

In the brushless motor shown in FIG. 10, when it is required to stop the rotor 1 of the motor at a predetermined position, the position sensors 3u to 3w are arranged so as to permit a predetermined positional relationship to be established between a position at which the rotor of the motor is stopped and a position of each of the position sensors 3u to 3w. Then, the rotational speed of the rotor is gradually reduced while detecting a rotational angular position of the rotor depending on an output of each of the position sensors 3u to 3w, resulting in the rotor being finally stopped at a target position. Alternatively, the above-described braking techniques are utilized to brake the rotor, so that the rotor may be ultimately stopped at the target position.

In the conventional brushless motor, it is required to carry out speed control in a complicated manner in order to stop the motor at a target position, resulting in electronic circuits for the output control section, the motor driving section and the like being complicated. Also, in the brushless motor, various kinds of control is carried out using a microcomputer. However, also in this instance, controlling of the stop position causes a software for operating a microcomputer to be complicated.

SUMMARY OF THE INVENTION

The present invention has been made in view of the foregoing disadvantage of the prior art.

Accordingly, it is an object of the present invention to provide a control device for a brushless motor which is capable of stopping the brushless motor without complicating a structure of the device.

It is another object of the present invention to provide a control device for a brushless motor which is capable of increasing an accuracy of a stop position while keeping the device from being complicated.

It is a further object of the present invention to provide a control method for a brushless motor which is capable of readily stopping the brushless motor.

It is still another object of the present invention to provide a control method for a brushless motor which is capable of stopping the brushless motor with increased accuracy.

In accordance with one aspect of the present invention, a control device is provided for a brushless motor including a rotor having a magnet field constituted by a plurality of magnetic poles and a stator including driving coils for a plurality of phases. The control device includes a position detection means for detecting a position of the rotor with respect to the driving coils for the plurality of phases to generate at least one position detection signal and a rotation control section fed with the position detection signal and generating at least one driving signal based on the position detection signal fed thereto. The rotation control section includes a latch means for generating the driving signal based on the position detection signal while it is fed with a rotation command and holding, when it is fed with a stop command, the driving signal in a state thereof obtained at the time of feeding of the stop command thereto. The control device also includes a motor driving section fed with the driving signal and flowing an excitation current through the driving coil for at least one of the plurality of phases determined depending on the driving signal fed thereto.

In a preferred embodiment of the present invention, the rotation control section further includes a stop position detection means for detecting a stop position of the rotor and a stop position correction driving signal generating means for generating, when the stop position of the rotor detected by the stop position detection means is deviated from a set position, the driving signal required for rotating the rotor to the set position.

In a preferred embodiment of the present invention, the motor driving section comprises a switch circuit including a plurality of switch elements for operating the excitation current flowed through each of the driving coils for the plurality of phases and a driving circuit for feeding at least one selected from the switch elements with trigger signals depending on a polarity of the driving signal fed thereto from the rotation control section. The latch means of the rotation control section holds a polarity of each of a plurality of driving signals when it is fed with the stop command.

In a preferred embodiment of the present invention, the position detection means comprises at least one position sensor arranged on a side of the stator so as to react with magnetic fluxes generated from the magnetic poles of the magnet field.

Also, in accordance with this aspect of the present invention, a control device is provided for a brushless DC motor including a rotor having a magnet field constituted by a plurality of magnetic poles and a stator including driving coils for a plurality of phases. The control device includes a position detector for detecting positional relationships between the driving coils for the plurality of phases and the plurality of magnetic poles to generate at least one position detection signal and a rotation control section for generating at least one driving signal based on the position detection signal. The rotation control section includes a latch means for generating the driving signal based on the position detection signal while it is fed with a rotation command and holding, when it is fed with a stop command, the driving signal at a level or polarity thereof obtained at the time of feeding of the stop command thereto. The control device also includes a motor driving section fed with the driving signal and flowing an excitation current through the driving coil for at least one of the plurality of phases determined depending on a level or polarity of the driving signal fed thereto.

In a preferred embodiment of the present invention, the rotation control section further includes a stop position detection means for detecting a stop position of the rotor and a stop position correction driving signal generating means for generating, when the stop position of the rotor detected by the stop position detection means is deviated from a set position, the driving signal required for rotating the rotor to the set position.

In a preferred embodiment of the present invention, the number of the driving coils for the plurality of phases is odd. The position detector includes an odd number of position sensors arranged in correspondence to the driving coils so as to react with magnetic fluxes generated from the magnetic poles of the magnet field. The rotation control section is constructed so as to generate signals corresponding to outputs of the position sensors in the form of a plurality of driving signals. The latch means includes a plurality of latch circuits each for holding each of the driving signals at the level or polarity thereof obtained at the time of feeding of the stop command thereto.

Further, in accordance with this aspect of the present invention, a control device is provided for a brushless motor including a rotor having a magnet field and a stator including driving coils for a plurality of phases. The control device includes a position detector arranged on a side of the stator to detect a position of the rotor to generate at least one position detection signal, a switch circuit including a plurality of switch elements for operating an excitation current flowed through each of the driving coils for the plurality of phases, and a distributor for determining the driving coil for at least one of the plurality of phases which is to be excited for rotating the rotor depending on the position detection signal. The distributor generates a plurality of on-off indication signals indicating whether the switch elements of the switch circuit should be turned on or turned off so that the excitation current is flowed through the driving coil determined. A rotation control section is arranged for controlling the switch elements of the switch circuit depending on a rotation command and a stop command. The rotation control section includes a latch means for generating a plurality of trigger signals for operating the switch elements which are indicated to be turned on or turned off by the on-off indication signals while it is fed with the rotation command and holding, when it is fed with the stop command, the trigger signals fed to each of the switch elements of the switch circuit in a state thereof obtained at the time of feeding of the stop command thereto.

In a preferred embodiment of the present invention, the control device further includes a stop position detection means for detecting a stop position of the motor and a stop position correction control signal generating means for generating the trigger signals for keeping the switch elements required for rotating the rotor to the set position turned on when the stop position of the rotor detected by the stop position detection means is deviated from a set position.

In a preferred embodiment of the present invention, the number of the driving coils for the plurality of phases is odd. The position detector includes an odd number of position sensors arranged in correspondence to the driving coils to react with fluxes generated from the magnetic poles of the magnet field, respectively and the rotation control section includes a plurality of latch circuits arranged in correspondence to the switch elements, respectively.

In a preferred embodiment of the present invention, the latch circuits hold a level or polarity of the trigger signals when the stop command is fed thereto.

Moreover, in accordance with this aspect of the present invention, a control device is provided for a brushless motor including a rotor having a magnet field and a stator including driving coils for a plurality of phases. The control device includes a position detector for detecting a position of the rotor to generate at least one position detection signal, a switch circuit including a plurality of switch elements for operating an excitation current flowed through each of the driving coils for the plurality of phases, and a distributor for determining the driving coil for at least one of the plurality of phases which is to be excited for rotating the rotor depending on the position detection signal. The distributor generates a plurality of on-off indication signals indicating whether the switch elements of the switch circuit should be turned on or turned off so that the excitation current is flowed through the driving coil determined. The control device also includes a rotation control section for controlling the switch elements of the switch circuit depending on a rotation command and a stop command. The rotation control section includes a plurality of trigger circuits for generating trigger signals for operating the switch elements which are indicated to be turned on or turned off by the on-off indication signals while the rotation command is fed thereto and holding, when the stop signal is fed thereto, all the trigger signals fed to the switch elements of the switch circuit in a state thereof obtained at the time of feeding of the stop signal thereto.

In accordance with another aspect of the present invention, there is a method for controlling a brushless motor including a rotor having a magnet field and a stator including driving coils for a plurality of phases. The method comprises the steps of detecting magnetic poles of the magnet field on a side of the stator by means of a position detector to generate signals corresponding to polarities of the magnetic poles being detected, determining the driving coil for at least one of the phases through which an excitation current is flowed depending on the signal generated from the position detector and flowing the excitation current through the driving coil determined, to thereby continue rotation of the rotor while a rotation command is generated, and continuing to flow the excitation current through the driving coil to stop the rotor when a stop command is generated.

In accordance with this aspect of the present invention, there is provided a method for controlling a brushless motor including a rotor having a magnet field and a stator including driving coils for a plurality of phases. The method comprises the steps of detecting magnetic poles of the magnet field on a side of the stator by means of a position detector to generate signals corresponding to polarities of the magnetic poles being detected, determining the driving coil for at least one of the phases through which an excitation current is flowed depending on the signal generated from the position detector and flowing the excitation current through the driving coil determined, to thereby continue rotation of the rotor while a rotation command is generated, continuing to flow the excitation current through the driving coil to stop the rotor when a stop command is generated, detecting a stop position of the rotor after the rotor is stopped, and selecting, when the stop position detected is deviated from a set position, at least one of the phases necessary for rotating the rotor to the set position as an excitation phase to keep the excitation coil for the excitation phase excited, to thereby rotate the rotor to the set position.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 3 is a flow chart showing control algorithm wherein a microcomputer is used for a rotation control section;

FIGS. 4(A) to 4(J) each are a waveform chart showing a waveform at each of sections of the control device of FIG. 1 with respect to an angle of rotation;

FIGS. 5(A) to 5(C) each are a waveform chart showing a waveform of an excitation current flowing through each of driving coils for three phases in the control device of FIG. 1, which is shown in a manner approximating to a rectangular wave;

FIGS. 6(A) to 6(C) each are a waveform chart showing a torque generated by each of driving coils for three phases U, V and W;

FIGS. 7(A) to 7(H) each are a waveform chart showing operation of the control device of FIG. 1;

DETAILED DESCRIPTION OF THE PREFERRED EMBODIMENTS

Now, a control device for a brushless motor according to the present invention will be described hereinafter with reference to FIGS. 1 to 10.

Figure 1:
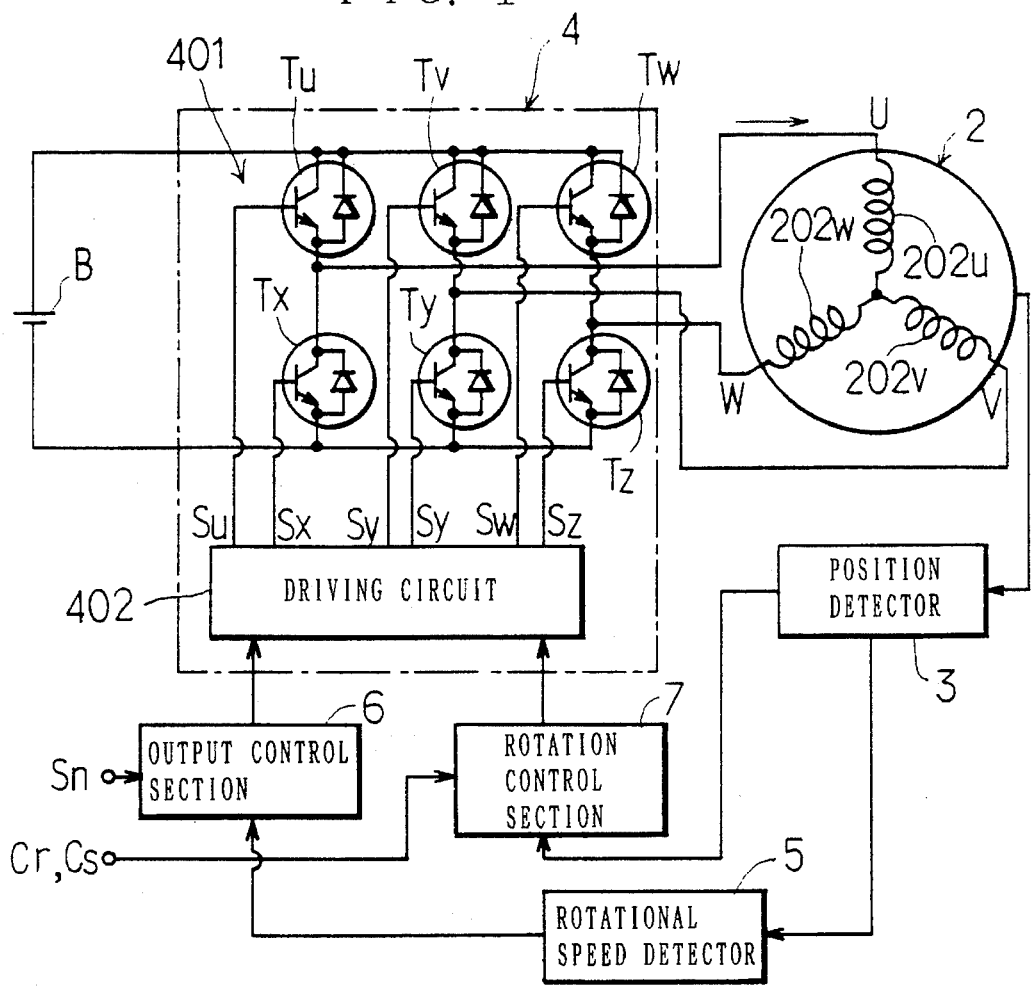
FIG. 1 is a block diagram schematically showing an embodiment of a control device for a brushless motor according to the present invention.

Referring first to FIG. 1, an embodiment of a control device for a brushless motor according to the present invention is illustrated. A control device of the illustrated embodiment is applied to the three-phase brushless motor described above with reference to FIG. 10 which includes the rotor 1 and stator 2. The stator 1 includes the driving coils 202u to 202w for three phases which are subject to star-connection. The position detector 3 includes the position sensors 3u, 3v and 3w each arranged for detecting a polarity of the magnet field 101 of the rotor 1 at a center of a magnetic pole section of each of the three phases U, V and W of the stator. The position sensors each may comprise, for example, a hall IC. In a motor of the type constructed in a manner similar to that in the illustrated embodiment, the number of position sensors arranged is defined to be one half the number of driving coils when the number of driving coils is even; whereas it is determined to correspond to the number of driving coils when the latter is odd. Also, when it is required to control only rotation and stop of the rotor, the embodiment may be so constructed that one such position sensor is arranged in correspondence to the driving coil for at least one phase to prepare a signal necessary for the control based on an output of the one position sensor.

Figure 10:
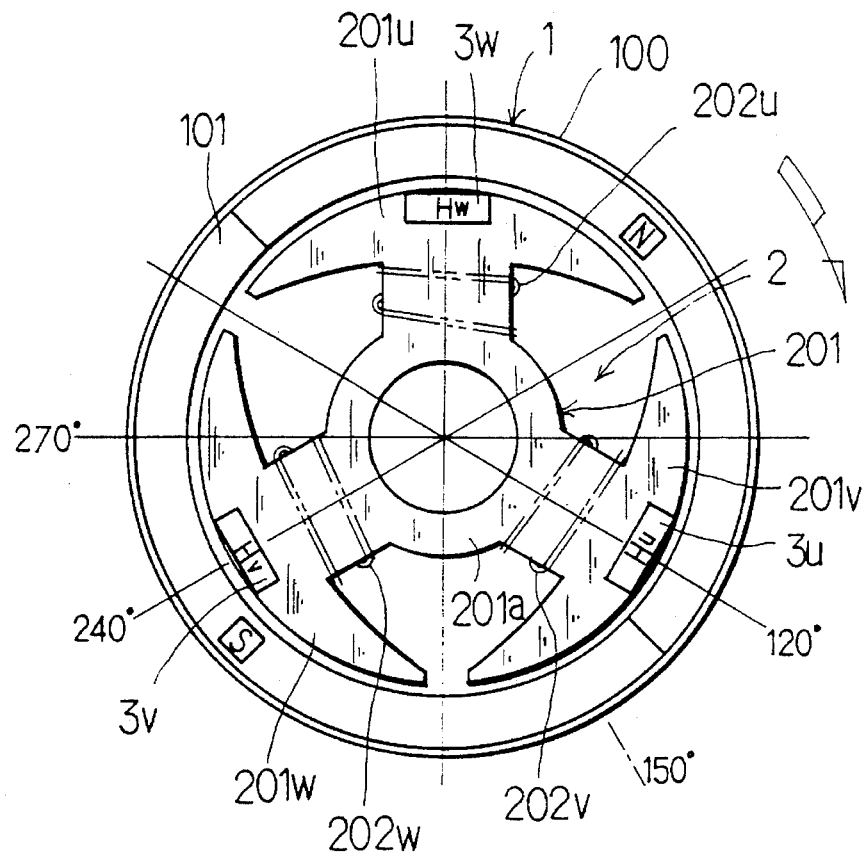
FIG. 10 is a front elevation view showing a brushless motor which includes a rotor and a stator and to which the present invention may be applied.
Figure 11:
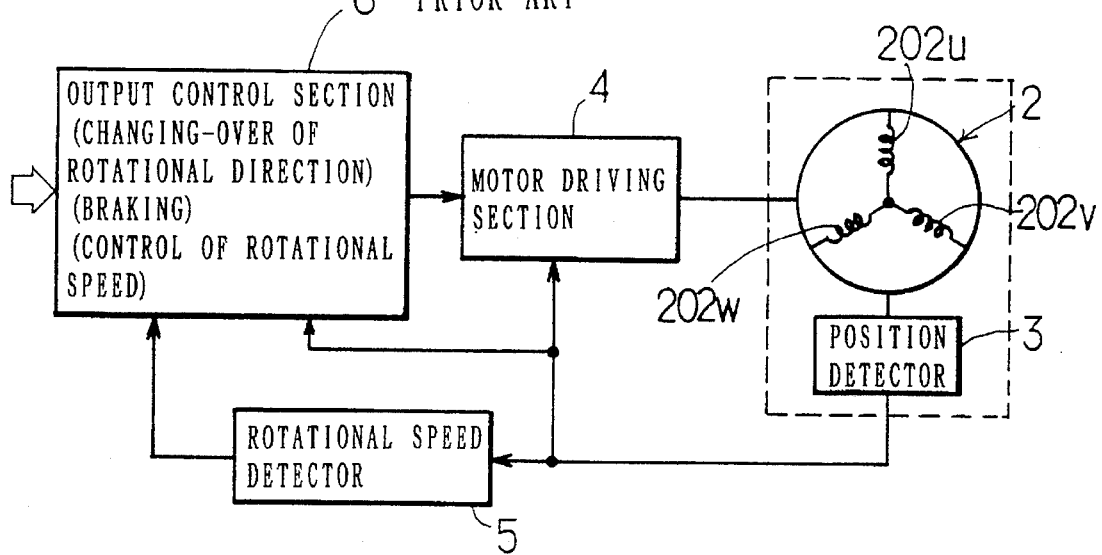
FIG. 11 is a block diagram showing a conventional brushless motor.

In FIG. 10, the position sensors each are mounted on the core of the stator 1. When printed boards are arranged in a row in an axial direction of the core 201 of the stator 1 and components for a control circuit are mounted on each of the printed boards, the position sensors are advantageously mounted on the printed boards.

A motor driving section 4 includes a switch circuit 401 and a driving circuit 402. The switch circuit 401 includes switch elements Tu, Tv and Tw and switch elements Tx, Ty and Tz which are subject to bridge connection. The switch elements each comprise a semiconductor switching element constructed so as to permit on-off control thereof to be carried out. The driving circuit 402 is constructed so as to feed each of the switch elements Tu to Tw and Tx to Tz with a control signal or a trigger signal. The switch elements each may comprise an NPN transistor and a diode connected in parallel between a collector of the transistor and an emitter thereof. When the transistor for each of the switch elements Tu to Tw and Tx to Tz is fed through a base thereof with a signal of a high level, the switch elements each are rendered conductive. Reference character B designates a DC power supply such as a battery or the like, of which an output is fed through the switch circuit 401 to the driving coils 202u to 202w.

The switching element which constitutes each of the switch elements Tu to Tw and Tx to Tz is not limited to the construction shown in FIG. 1. PNP transistors may be used for any one or both of the switch elements Tu to Tw and switch elements Tx to Tz. Alternatively, an FET or the like in place of the transistor may be used for each of the switching elements.

In the illustrated embodiment, a position detector 3 which comprises three position sensors and acts as a position detection means generates three position detection signals, which are fed through a rotation control section 7 to a driving circuit 402. The rotation control section 7 includes a latch means including three latch circuits which generates a signal of the same polarity as the three position detection signals generated from the position detector 3 when a rotation command Cr is fed thereto from a control command section (not shown). Also, the latch circuits, when a stop command Cs is fed thereto, function to hold a polarity of each of the three position detection signals determined at the time of feeding of the stop command thereto, to thereby fix a polarity of the output signal. An output of each of the latch circuits acts as a driving signal, which is then fed to the driving circuit 402.

The driving circuit 402 functions to concurrently feed a trigger signal to one selected from the switch elements Tu to Tw and one selected from the switch elements Tx to Tz depending on a polarity of the driving signal fed thereto from the rotation control section 7.

When the position sensors 3u to 3w are arranged in such a manner as shown in FIG. 10, position detection signals $e_u$ to $e_w$ generated by the position sensors 3u to 3w have such rectangular waveforms as shown in FIGS. 4(A) to 4(C), respectively, wherein H designates a high level and L is a low level (or zero level).

Then, when the rotation control section 7 feeds a driving signal of the same polarity as the position detection signals $e_u$ to $e_w$ to the driving circuit 402, the driving circuit generates trigger signals Su to Sw and Sx to Sz, which are then fed to control terminals of the switch elements Tu to Tw and Tx to Tz (the bases of the transistors). The trigger signals Su, Sv and Sw have waveforms shown in FIG. 4(D) to 4(F), respectively, and the trigger signals Sz, Sy and Sx have waveforms shown in FIGS. 4(G) to 4(I), respectively. "ON" and "OFF" in each of FIGS. 4(D) to 4(I) indicate levels at which the switch fed with each of the trigger signals is rendered conductive and nonconductive, respectively.

The trigger signals may be obtained by subjecting the position detection signals $e_u$ to $e_w$ to predetermined logic operation. For example, the position detection signal $e_v$ may be obtained by taking a logical product (AND) between the position detection signal $e_u$ and a negative signal (inverted signal) of the position detection signal $e_v$ and the trigger signal Sv may be obtained by taking a logical product (AND) between the position detection signal $e_v$ and a negative signal (inverted signal) of the position detection signal $e_w$.

Excitation currents flowing through the driving coils 202u to 202w for the phases U to W when the trigger signals shown in FIGS. 4(D) to 4(I) are fed to the control terminals of the switch elements Tu to Tw and Tx to Tz have waveforms approximating to rectangular waveforms shown in FIGS. 5(A) to 5(C), respectively. In each of FIGS. 5(A) to 5(C), a current of a positive polarity indicates an excitation current flowing into the driving coil for each phase, which excitation current permits the magnetic pole for each phase of the stator 1 to be excited so as to indicate an N pole. Also, in each of FIGS. 5(A) to 5(C), a current of a negative polarity is an excitation current flowing out of the driving coil for each phase, which permits the magnetic pole of each phase of the stator 1 to be excited so as to indicate an S pole.

Flowing of such excitation currents as shown in FIGS. 5(A) to 5(C) to the driving coils 202u to 202w for the three phases U to W causes such torques as shown in FIGS. 6(A) to 6(C) to occur at the phases U to W. Then, the torques are synthesized, followed by feeding to the rotor.

The driving circuit 402 also includes a PWM (pulse width modulation) control circuit for operating the switch elements of the switch circuit 401 depending on the rotational speed control signal fed thereto from the output control section 6 to subject the excitation current fed to the driving coil to PWM control, so that a magnitude of the rotational speed control signal is varied to adjust a rotational speed of the motor.

The motor driving section 4 may be constructed in the same manner as that used for the conventional brushless motor control device.

Reference numeral 5 designates a rotational speed detector, which includes a circuit for generating a pulse signal P for rotational speed detection at each of rising and falling positions of the rectangular signals $e_u$ to $e_w$ shown in FIGS. 4(A) to 4(C), as shown in FIG. 4(J), to thereby detect a frequency of the pulse signal P, resulting in detecting a rotational speed of the motor.

The output control section 6 functions to carry out comparison between the rotational speed detection signal generated from the rotational speed detector 5 and a signal Sn indicating an indicated value of a rotational speed of the motor, resulting in feeding a rotational speed control signal required for eliminating any deviation between both signals to the driving circuit 402.

In the illustrated embodiment, the rotation command signal Cr is a signal of an L level, for example, as shown in FIG. 7(F), whereas the stop command signal Cs is an H level. The latch means of the rotation control section 7 generates a driving signal of the same polarity as the positional detection signals $e_u$ to $e_w$ (FIGS. 7(A) to 7(C)) while it is fed with the rotation command signal Cr, which driving signal is then fed to the driving circuit 402. This results in excitation phases of the driving coils being changed over as described above, to thereby cause torques to be produced at the phases U to W as shown in FIG. 7(G), so that a synthesized torque may be produced at the rotor as shown in FIG. 7(H) to rotate the rotor in a predetermined direction.

When the stop command Cs is fed to the rotation control section 7 at a rotation angle of $\theta_o$, the latch means of the rotation control section 7 comprising the three latch circuits holds a polarity of each of the position detection signals $e_u$ to $e_w$ defined when the stop command is generated, as shown in FIGS. 7(A) to 7(C). This results in a polarity of the driving signal generated from the rotation control section 7 being fixed at a polarity defined when the stop command Cs is fed thereto. Then, the driving circuit 402 continues to generate the trigger signals of which generation is started at the time when the stop command is fed thereto. In FIG. 7, continuous generation of the trigger signals Sw and Sx is started when the driving circuit 402 is fed with the stop command Cs. At this time, flowing of an excitation current through each of the driving coils for the phases U and W is still continued.

As shown in FIG. 7(H), immediately after feeding of the stop command to the rotation control section 7, the torques are produced in the same direction as that of rotation of the motor being carried out; so that the rotor is kept rotated in the same direction. Further rotation of the rotor increases the torque for the phase W and decreases the torque for the phase U; so that the synthesized torque (FIG. 7(H)) is reduced to reduce a rotational speed of the rotor. Then, the torque for the phase U enters a negative region; so that when it exceeds the positive torque for the phase W, the synthesized torque is rendered negative, to thereby substantially brake the rotor. The synthesized torque is then varied in a manner like a sinusoidal wave. Then, the rotor is braked every time when the synthesized torque enters the negative region. When such intermittent braking causes a rotational speed of the rotor to be reduced, the rotor is ultimately stopped at a position $O_a$ where the negative torque for the phase U and the positive torque for the phase W are balanced or the synthesized torque is rendered zero. A position at which the synthesized torque is rendered zero appears at every angular interval of 180 degrees. A position at which the synthesized torque is rendered zero in the course of transition of the synthesized torque from the negative region to the positive region constitutes an unstable point, whereas that in the course of transition of the synthesized torque from the positive region to the negative region constitutes a stable point. Normally, the rotor is stopped at the stable point. For example, when the brushless motor is so constructed that the stator is of three phases and the rotor is of two poles, six such stable points may be defined.

When a position at which the stop command is fed is fixed and a magnitude of an excitation current flowed to a phase for fixing excitation when the stop command is fed is kept constant, positions at which the synthesized torque is rendered zero are rendered constant; so that a position at which the rotor is stopped when the stop command is fed may be fixed.

In order to fix the stop position, it is required to fix a stop command feed position or a position at which the stop command is fed. The stop command feed position may be readily determined based on a position of rising or falling of the position detection signal. For example, in order to fix a polarity of an excitation current for each of the phases U and W while flowing the excitation current through each of the driving coils 202u and 202w for the phases U and W or in order to continue to flow the excitation current through each of both driving coils, it is merely required to feed the stop command to the rotation control section 7 at a position of rising of the position detection signal $e_w$ or a position immediately following the rising position. Also, in order to fix a polarity of an excitation current for each of the phases V and U while flowing the excitation current through each of the driving coils 202v and 202u for the phases V and U or in order to continue to flow the excitation current through each of both driving coils, it is merely required to feed the stop command to the rotation control section 7 at a position of falling of the position detection signal $e_u$ or a position immediately following the falling position.

In the illustrated embodiment, the rotor of the motor is stopped at the stop position or stable point by fixing the excitation phase when the stop command is fed or holding properties or a polarity of a driving signal fed from the rotation control section 7 to the driving circuit 402 in a state thereof obtained when the stop command is fed. However, when a plurality of stable points such as six stable points in the illustrated embodiment are defined, the rotor is not necessarily stopped at the same stable points, resulting in being often stopped at any unstable point. Thus, when the stop position of the rotor of the motor is deviated from a set position, a polarity of an input signal of the motor driving section or a driving signal generated from the rotation control section 7 is varied to rotate the rotor toward the set position and then the varied polarity is held to move the motor to the set position. Such operation may be repeated many times until the motor reaches the set position.

Figure 2:
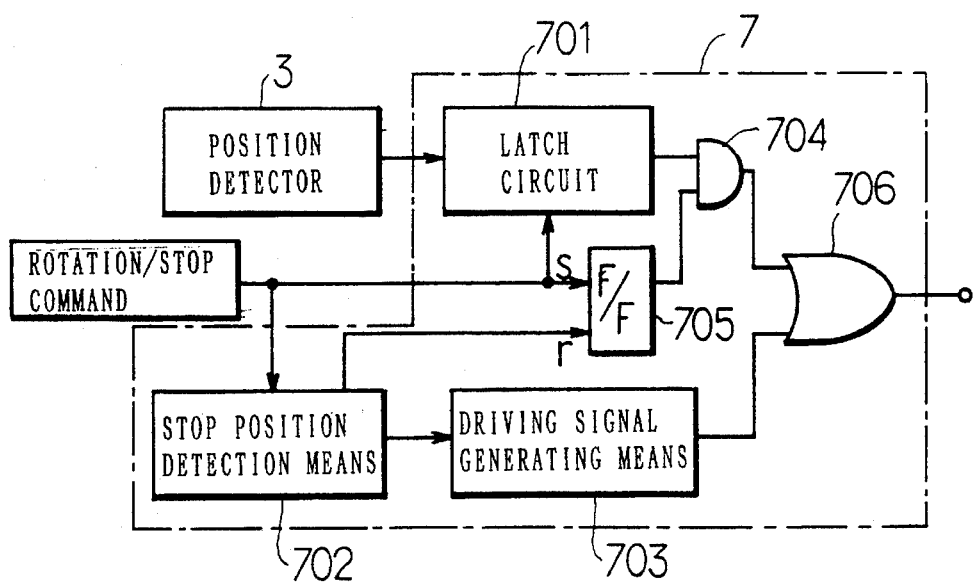
FIG. 2 is a block diagram showing a rotation control section incorporated in another embodiment of the present invention.

The control described above may be carried out by constructing the rotation control section 7 in such a manner as shown in FIG. 2. More particularly, it includes a portion for controlling the stop position of the motor which includes a latch circuit 701, a stop position detection means 702, a driving signal generating means 703, an AND circuit 704, a flip-flop circuit 705 and an OR circuit 706. The rotation control section 7 of FIG. 2 is constructed so as to accommodate to a single position detection signal or a single position sensor. In order to accommodate to three position detection signals or three position sensors, the rotation control section is provided with three circuit structures constructed in substantially the same manner. In this instance, the three latch circuits cooperate with each other to provide a latch means.

The latch circuit 701 functions to generate a driving signal of a polarity corresponding to that of an output signal of one of the position sensors of the position detector 3 while the rotation command is fed thereto and hold a level or polarity of the driving signal being generated when the stop command is fed thereto.

The stop position detection means 702 acts to detect a stop position of the rotor. For this purpose, for example, the stop position detection means 702 may be fed with a pulse signal generated in synchronism with rotation of the rotor to start counting of the pulse signal at the time when the stop command is fed, to thereby generate the stop position detection signal indicating a stop position of the rotor when stop of the rotor is detected. The stop position detection means 702 also functions to reset the flip-flop circuit 705 when stop of the rotor is detected.

The driving signal generating means 703 compares the stop position of the rotor detected by the stop position detection means 702 with the set position every time when the rotor is stopped, resulting in generating a driving signal of a level or polarity required for rotating the rotor toward the set position when the stop position is deviated from the set position.

The flip-flop circuit 705 is set to output a signal of a high level when it is fed with the rotation command signal and then reset to change the output signal from the high level to a zero level when stop of the rotor is detected by the stop position detection means 702.

The output of the flip-flop circuit 705 is fed to the AND circuit 704 together with the output of the latch circuit 701, so that the AND circuit 704 generates an output, which is fed to the OR circuit 706 together with the output of the driving signal generating means 703. Then, the OR circuit 706 generates an output, which is then fed in the form of a driving signal to the motor driving section.

In FIG. 2, the AND circuit 704, flip-flop circuit 705 and OR circuit 706 cooperate with each other to constitute a driving signal output means for feeding the output of the latch circuit 701 as the driving signal to the motor driving section 4 during operation of the motor and feeding the output of the driving signal generating means 703 as the driving signal to the motor driving section 4 after the motor is interrupted.

In the rotation control section 7 of FIG. 2, when the rotation command is fed to the flip-flop circuit 705, it is set to generate a signal of a high level. In this state, AND conditions of the AND circuit 704 are established every time when the latch circuit 701 generates the driving signal, so that the driving signal is fed through the AND circuit 704 and OR circuit 706 to the motor driving section 4, to thereby rotate the rotor.

When the stop command is generated, the latch circuit 701 arranged in correspondence to each of all the position detection signals (or position sensors) fixes a level of each of all the driving signals fed to the motor driving section 4, so that the rotor is stopped. Upon stop of the rotor, the stop position detection means 702 resets the flip-flop circuit 705, so that the output of the flip-flop circuit is rendered zero. This causes a failure in establishment of the AND conditions of the AND circuit 704, to thereby interrupt feeding of the driving signal from a side of the latch circuit.

The stop position detection means 702 also generates a stop position detection signal indicating a stop position of the rotor. When the stop position detected by the stop position detection means does not coincide with a set position, the driving signal generating means 703 generates a driving signal of a polarity required for rotating the rotor toward the set position. The driving signal thus generated is fed through the OR circuit 706 to the motor driving section 4, so that the rotor is rotated by a suitable angle toward the set position and then stopped again. When this permits the re-stop position of the rotor to be aligned or coincide with the set position, the driving signal generating means 703 does not generate the driving signal any longer, so that the rotor is kept stopped.

In FIG. 2, the stop position detection means 702 and driving signal generating means 703 each may be arranged in common to the three position detection signals.

In FIG. 2, a function of each of the stop position detection means 702, the driving signal generating means 703, and the driving signal output circuit comprising the AND circuit, flip-flop circuit and OR circuit may be realized by a microcomputer. Algorithm wherein feeding of the driving signal is controlled by a microcomputer is shown in FIG. 3.

Now, the manner of operation of the rotation control section by algorithm of FIG. 3 will be described hereinafter.

When the rotation command is generated, the position detection signal is fetched from the position detector 3, so that a signal of the same level as the position detection signal is fed to the motor driving section 4 to rotate the rotor.

When the stop command is generated, a level of the driving signal being generated at that time is fixed, to thereby stop rotation of the rotor. A deviation D between the stop position and the set position is operated to judge whether the deviation D is at an allowable level ε or below. When the deviation D exceeds the allowable level ε, a driving signal necessary to rotate the rotor toward the set position is generated. The operation is repeated until the deviation between the stop position and the set position is at the allowable level or below. The stop position control is terminated when the deviation is at the allowable level or below.

Detection of the stop position may be carried out, for example, by starting counting of a pulse signal (for example, the signal of FIG. 7(D)) generated at predetermined angular intervals at the time of rising of the position detection signal for any particular phase.

In the illustrated embodiment, the rotation control section 7s is provided between the position detector 3 and the motor driving section 4. Alternatively, the rotation control section 7 may be arranged in the motor driving section. A driving circuit for the motor driving section 4 generally includes a distributor which is fed with the position detection signal to generate an on-off indication signal indicating whether the switch elements of the switch circuit 401 each should be rendered turned on or turned off, so that the switch elements of the switch circuit each may be fed with the control signal or trigger signal (a signal for rendering the switch element turned on or turned off) depending on the on-off indication signal generated by the distributor. Such construction of the motor driving section permits the rotation control section to be located between the distributor and the switch circuit.

Figure 8:
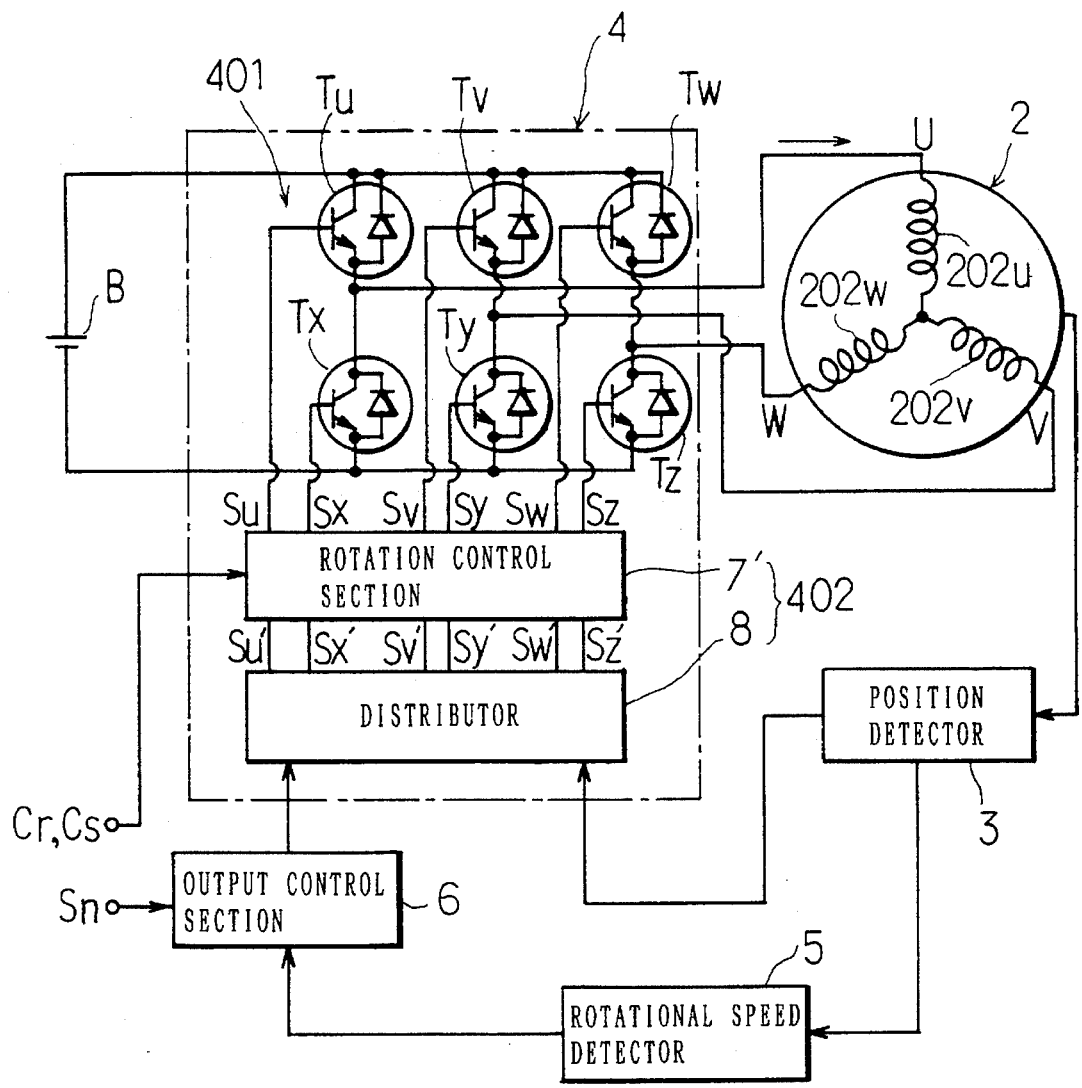
FIG. 8 is a block diagram schematically showing a further embodiment of a control device for a brushless motor according to the present invention.

Referring now to FIG. 8, another embodiment of a control device for a brushless motor according to the present invention is illustrated, which is constructed so as to arrange a driving circuit between a distributor and a switch circuit. In FIG. 8, reference numeral 8 is a distributor and 7' is a rotation control section for controlling switch elements of a switch circuit 401 depending on a rotation command and a stop command. The distributor 8 and rotation control section 7' constitute a driving circuit 402.

The distributor 8 generates on-off indication signals Su', Sx', Sv', Sy', Sw' and Sz' respectively indicating whether switch elements Tu, Tx, Tv, Ty, Tw and Tz of the switch circuit 401 should be turned on or turned off so that position detection signals for three phases generated from a position detector 3 are subject to logical operation to determine a phase to be excited for rotation of a rotor of a motor, to thereby flow an excitation coil to a driving coil for the phase determined. The on-off indication signals Su', Sv', Sw', Sz', Sy' and Sx' have substantially the same waveforms as those of the signals Su, Sv, Sw, Sz, Sy and Sx shown in FIGS. 4(D) to 4(I).

Figure 9:
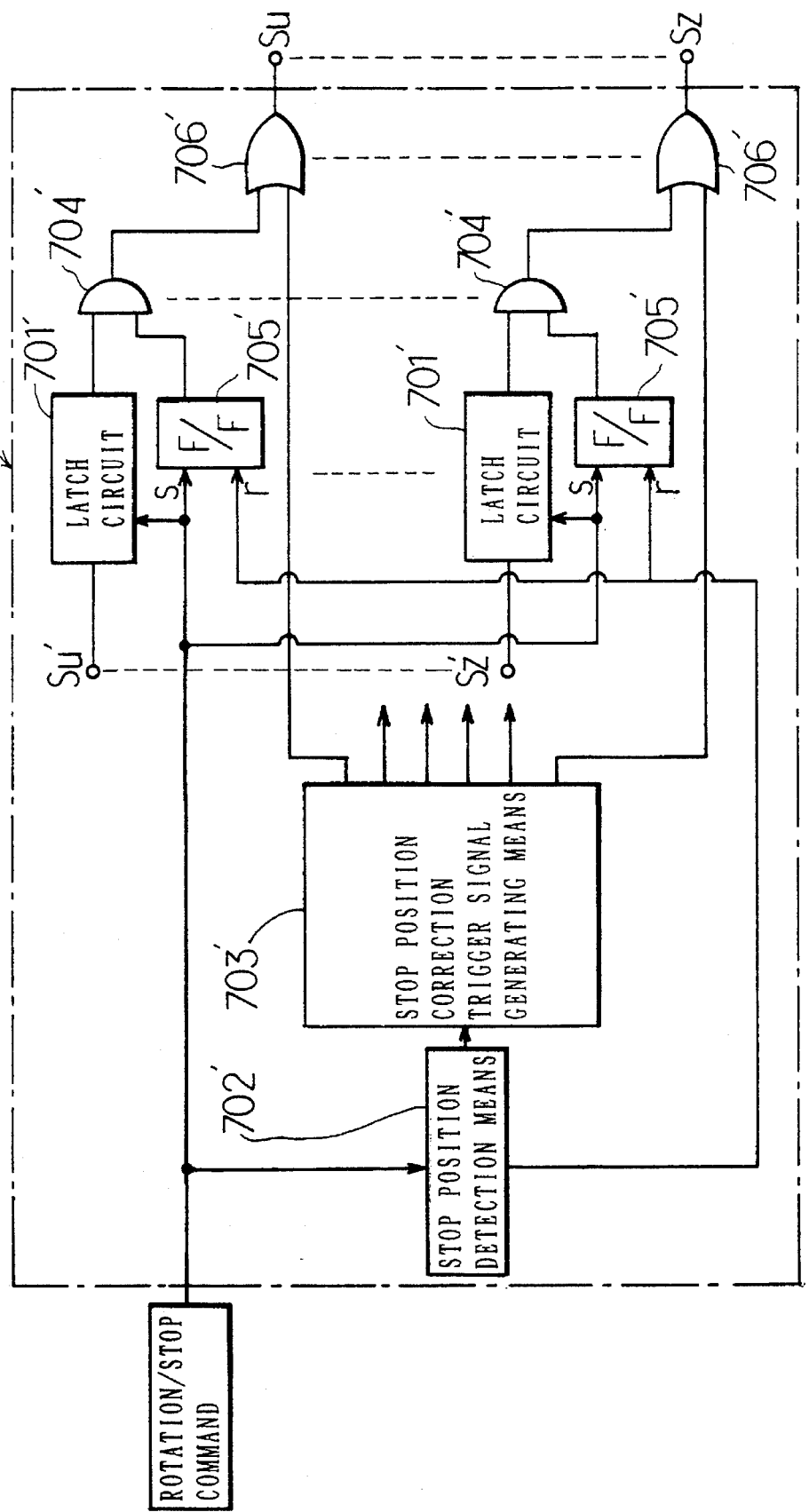
FIG. 9 is a block diagram showing a rotation control section incorporated in the control device of FIG. 8.

The rotation control section 7' may be constructed in such a manner as shown in FIG. 9. In FIG. 9, latch circuits 701', AND circuits 704', flip-flop circuits 705' and OR circuits 706' are arranged in correspondence in number to the on-off indication signals (six in the embodiment), so that the on-off indication signals Su', Sv', Sw', Sz', Sy' and Sx' are input to the corresponding latch circuits 701' respectively The flip-flop circuits 705' each are fed at a set terminal s thereof with a rotation command signal and at a reset terminal r thereof with a reset signal from a stop position detection means 702'. The AND circuits each are fed with outputs of the latch circuit 701' and flip-flop circuit 705' corresponding thereto and the OR circuits 706' each are fed with an output of a stop position correction control signal generating means 703 for generating a control signal for correcting a stop position of the rotor, as well as an output of the AND circuit 704' corresponding thereto.

The latch circuits 701' generates a driving signal of a level corresponding to that of the on-off indication signal while it is fed with the rotation command and holds, when it is fed with the stop command, a level or polarity of a trigger signal being output at the time of feeding of the stop command.

The stop position detection means 702' is adapted to detect a stop position of the rotor. For this purpose, the stop position detection means 702' may be constructed so as to utilize a pulse signal generated in synchronism with rotation of the rotor of the motor to start counting of the pulse signal at the time when the stop command is fed thereto, to thereby generate a stop position detection signal indicating the stop position when stop of the rotor is detected. Also, the stop position detection means 702' resets the flip-flop circuits 705' when stop of the rotor is detected.

The stop position correction trigger signal generating means 703' compares the stop position of the motor detected by the stop position detection means 702' with a set position every time when the rotor is stopped, leading to generation of a trigger signal to be fed to the switch elements of the switch circuit in order to rotate the motor toward the set position when the stop position is deviated from the set position.

The flip-flop circuits 705' each are set when the rotation command signal is fed thereto, to thereby generate a signal of a high level and are reset when stop of the motor is detected by the stop position detection means 702', to thereby change the output signal from the high level to a zero level.

The outputs of the flip-flop circuits 705' are fed to the corresponding AND circuits 704' together with the outputs of the latch circuits 701', respectively, and the outputs of the AND circuits 704' are fed to the corresponding OR circuits 706' together with the output of the stop position correction trigger signal generating means 703', respectively. Then, the outputs of the OR circuits 706' each are fed in the form of a trigger signal to the corresponding switch element of the switch circuit 401.

In FIG. 7, the AND circuit 704' flip-flop circuit 705' and OR circuit 706' corresponding to each other cooperate together to constitute a control signal output means for feeding an output of the latch circuit 701' in the form of a trigger signal to the switch circuit 401 during operation of the motor and feeding an output of the stop position correction trigger signal generating signal 703' in the form of a trigger signal to the switch circuit 401 when the motor is interrupted.

In FIG. 9, when the rotation control section 7' is fed with the rotation command, the flip-flop circuit 705' is set to generate a signal of a high level. This permits AND conditions of the AND circuit 704' to be established every time when the latch circuit generates a trigger signal, so that the trigger signal is fed to each of the switch elements of the switch circuit 401 through the AND circuit 704' and OR circuit 706', resulting in the rotor being rotated.

Then, when the stop command is fed to the rotation -control section 7', the latch circuit 701' fixes a level or polarity of the trigger signal, leading to stop of the rotor. Stop of the motor causes the stop position detection means 702' to reset the flip-flop circuit 705', to thereby cause the output of the flip-flop circuit to be zero. This leads to a failure in establishment of the AND conditions of the AND circuit 704', to thereby prevent feeding of the trigger signal from the latch circuit 704'.

The stop position detection means 702' also generates a stop position detection signal indicating a stop position of the motor. When the stop position detected by the stop position detection signal does not coincide with the set position, the stop position correction trigger signal generating means 703' generates a trigger signal required for rotating the motor toward the set position. The trigger signal thus generated is fed through each of the OR circuits 706' to the switch elements of the switch circuit 401, so that the rotor is rotated by a suitable angle toward the set position and then stopped again. When this permits the re-stop position of the motor to coincide with the set position, the stop position correction trigger signal generating means 703' generates the control signal no longer, resulting in the rotor being kept stopped.

In the embodiments described above, the pulse signal generated at each of rising and falling positions of each of the position detection signals $e_u$ to $e_w$ is used for detection of the stop position. Alternatively, the embodiments each may be so constructed that the motor is mounted thereon with a rotary encoder for detecting the stop position with increased accuracy, so that pulse signals Q are generated at narrow intervals as shown in FIG. 7(E), to thereby detect the stop position.

The embodiments each have been described in connection with the three-phase brushless DC motor. However, the present invention may be applied to any brushless motor irrespective of the number of phases. Also, the above-described embodiments each employ a full-wave driving system wherein the switch elements twice as many as the driving coils are arranged to flow an excitation current of both positive and negative polarities (full-wave current) through each of the driving coils. Alternatively, the present invention may employ a half-wave driving system wherein the switch elements as many as the driving coils are arranged to permit an excitation current of one polarity (half-wave current) to be flowed through each of the driving coils.

As can be seen from the foregoing, the present invention is constructed so as to fix the phase for flowing an excitation current, to thereby stop the rotor when the stop command is generated. Thus, the present invention keeps a position at which the stop command is fed fixed, to thereby permit the rotor to be stopped at a target position without any complicated control.

Also, the present invention is constructed so as to rotate the rotor to the set position and then stop it by fixing the phase for flowing of an excitation current to interrupt rotation of the rotor when the stop command is fed, followed by selection of the phase required for rotation of the motor to the set position as an excitation phase to keep the driving coil for the excitation phase excited. Thus, the rotor may be constantly stopped at a fixed target position irrespective of a position at which the stop command is fed.

Further, when a level or polarity of the driving signal is held by the latch circuit, the number of latch circuits may be permit to halve as compared with the case that a level or polarity of the trigger signal is held by the latch circuit.

While preferred embodiments of the invention have been described with reference to the drawings, obvious modifications and variations are possible in light of the above teachings. It is therefore to be understood that within the scope of the appended claims, the invention may be practiced otherwise than as specifically described.

What is claimed is:

1. A control device for a brushless motor including a rotor having a magnet field constituted by a plurality of magnetic poles and a stator including driving coils for a plurality of phases, comprising:

a position detection means for detecting a position of said rotor with respect to said driving coils for said plurality of phases to generate at least one position detection signal;

a rotation control section fed with said position detection signal and generating at least one driving signal based on said position detection signal fed thereto;

said rotation control section including a latch means for generating said driving signal based on said position detection signal while it is fed with a rotation command and holding, when it is fed with a stop command, said driving signal in a state thereof obtained at the time of feeding of the stop command thereto; and a motor driving section fed with said driving signal and flowing an excitation current through said driving coil for at least one of said plurality of phases determined depending on said driving signal fed thereto.

2. A control device as defined in claim 1, wherein said rotation control section further includes a stop position detection means for detecting a stop position of said rotor and a stop position correction driving signal generating means for generating, when the stop position of said rotor detected by said stop position detection means is deviated from a set position, said driving signal required for rotating said rotor to said set position.

3. A control device as defined in claim 2, wherein said motor driving section comprises a switch circuit including a plurality of switch elements for operating the excitation current flowed through each of said driving coils for said plurality of phases and a driving circuit for feeding at least one selected from said switch elements with trigger signals depending on a polarity of said driving signal fed thereto from said rotation control section;

said latch means of said rotation control section holding a polarity of each of a plurality of driving signals when it is fed with said stop command.

4. A control device as defined in claim 1, wherein said position detection means comprises at least one position sensor arranged on a side of said stator so as to react with magnetic fluxes generated from said magnetic poles of said magnet field.

5. A control device for a brushless DC motor including a rotor having a magnet field constituted by a plurality of magnetic poles and a stator including driving coils for a plurality of phases, comprising:

a position detector for detecting positional relationships between said driving coils for said plurality of phases and said plurality of magnetic poles to generate at least one position detection signal;

a rotation control section for generating at least one driving signal based on said position detection signal;

said rotation control section including a latch means for generating said driving signal based on said position detection signal while it is fed with a rotation command and holding, when it is fed with a stop command, said driving signal at a level or polarity thereof obtained at the time of feeding of the stop command thereto; and a motor driving section fed with said driving signal and flowing an excitation current through said driving coil for at least one of said plurality of phases determined depending on a level or polarity of said driving signal fed thereto.

6. A control device as defined in claim 5, wherein said rotation control section further includes a stop position detection means for detecting a stop position of said rotor and a stop position correction driving signal generating means for generating, when the stop position of said rotor detected by said stop position detection means is deviated from a set position, said driving signal required for rotating said rotor to said set position.

7. A control device as defined in claim 5, wherein the number of said driving coils for said plurality of phases is odd;

said position detector including an odd number of position sensors arranged in correspondence to said driving coils so as to react with magnetic fluxes generated from said magnetic poles of said magnet field;

said rotation control section being constructed so as to generate signals corresponding to outputs of said position sensors in the form of a plurality of driving signals;

said latch means including a plurality of latch circuits each for holding each of said driving signals at the level or polarity thereof obtained at the time of feeding of the stop command thereto.

8. A control device for a brushless motor including a rotor having a magnet field and a stator including driving coils for a plurality of phases, comprising:

a position detector arranged on a side of said stator to detect a position of said rotor to generate at least one position detection signal;

a switch circuit including a plurality of switch elements for operating an excitation current flowed through each of said driving coils for said plurality of phases;

a distributor for determining the driving coil for at least one of said plurality of phases which is to be excited for rotating said rotor depending on said position detection signal;

said distributor generating a plurality of on-off indication signals indicating whether said switch elements of said switch circuit should be turned on or turned off so that the excitation current is flowed through said driving coil determined; and a rotation control section for controlling said switch elements of said switch circuit depending on a rotation command and a stop command;

said rotation control section including a latch means for generating a plurality of trigger signals for operating the switch elements which are indicated to be turned on or turned off by said on-off indication signals while it is fed with the rotation command and holding, when it is fed with the stop command, said trigger signals fed to each of said switch elements of said switch circuit in a state thereof obtained at the time of feeding of the stop command thereto.

9. A control device as defined in claim 8, further comprising a stop position detection means for detecting a stop position of said motor; and a stop position correction control signal generating means for generating said trigger signals for keeping said switch elements required for rotating said rotor to a set position turned on when the stop position of said rotor detected by said stop position detection means is deviated from said set position.

10. A control device as defined in claim 9, wherein the number of said driving coils for said plurality of phases is odd;

said position detector includes an odd number of position sensors arranged in correspondence to said driving coils to react with fluxes generated from the magnetic poles of said magnet field, respectively; and said rotation control section includes a plurality of latch circuits arranged in correspondence to said switch elements, respectively.

11. A control device as defined in claim 10, wherein said latch circuits hold a level or polarity of said trigger signals when said stop command is fed thereto.

12. A control device for a brushless motor including a rotor having a magnet field and a stator including driving coils for a plurality of phases, comprising:

a position detector for detecting a position of said rotor to generate at least one position detection signal;

a switch circuit including a plurality of switch elements for operating an excitation current flowed through each of said driving coils for said plurality of phases;

a distributor for determining the driving coil for at least one of said plurality of phases which is to be excited for rotating said rotor depending on said position detection signal;

said distributor generating a plurality of on-off indication signals indicating whether said switch elements of said switch circuit should be turned on or turned off so that the excitation current is flowed through said driving coil determined; and a rotation control section for controlling said switch elements of said switch circuit depending on a rotation command and a stop command;

said rotation control section including a plurality of trigger circuits for generating trigger signals for operating said switch elements which are indicated to be turned on or turned off by said on-off indication signals while the rotation command is fed thereto and holding, when the stop command is fed thereto, all the trigger signals fed to said switch elements of said switch circuit in a state-thereof obtained at the time of feeding of the stop command thereto.

13. A method for controlling a brushless motor including a rotor having a magnet field and a stator including driving coils for a plurality of phases, comprising the steps of;

detecting magnetic poles of the magnet field on a side of said stator by means of a position detector to generate signals corresponding to polarities of the magnetic poles being detected;

determining the driving coil for at least one of said phases through which an excitation current is flowed depending on said signal generated from said position detector and flowing the excitation current through said driving coil determined, to thereby continue rotation of the rotor while a rotation command is generated;

continuing to flow said excitation current through said driving coil to stop the rotor when a stop command is generated;

detecting a stop position of the rotor after the rotor is stopped; and selecting, when said stop position detected is deviated from a set position, at least one of said phases necessary for rotating the rotor to said set position as an excitation phase to keep the excitation coil for said excitation phase excited, to thereby rotate the rotor to the set position.

* * * * *